Feb. 12, 1924.  1,483,426
H. W. FLETCHER
WEIGHT INDICATOR
Filed Sept. 6, 1921
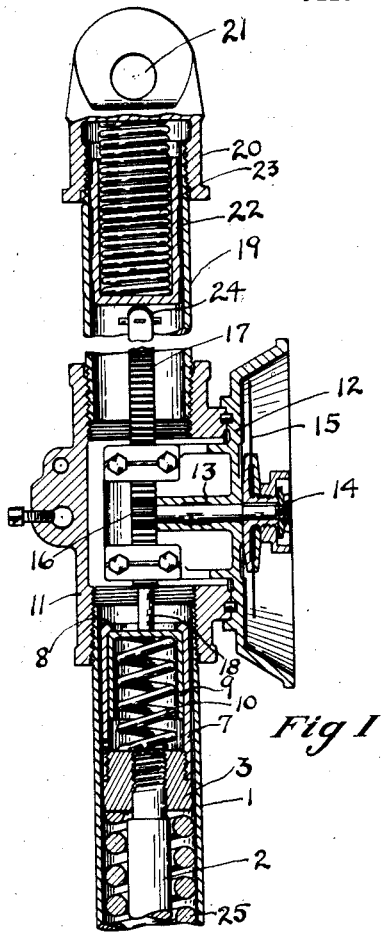
Fig 1
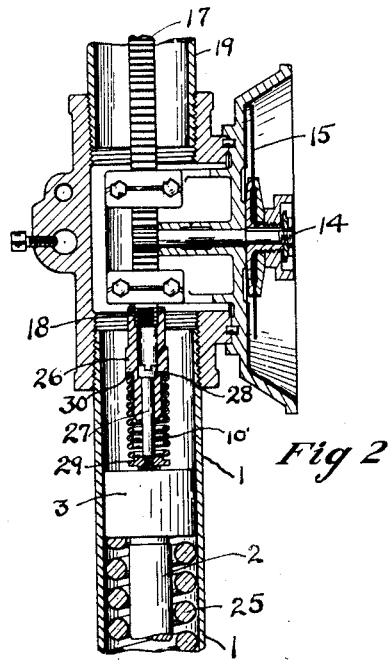
Fig 2
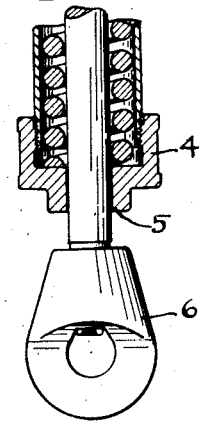
H.W. Fletcher INVENTOR.
BY Jesse R. Stone
HIS ATTORNEY.

Patented Feb. 12, 1924.

1,483,426

UNITED STATES PATENT OFFICE.

HAROLD W. FLETCHER. OF HOUSTON, TEXAS, ASSIGNOR TO HUGHES TOOL COMPANY.

WEIGHT INDICATOR.

Application filed September 6, 1921. Serial No. 498,855.

*To all whom it may concern:*

Be it known that I, HAROLD W. FLETCHER, a citizen of the United States, residing at Houston, Harris County, Texas, have invented a certain new and useful Improvement in Weight Indicators, of which the following is a full, clear, and exact description, such as will enable others skilled in the art to which it appertains to make and use the same.

My invention relates to an improvement in weight indicators and has especial application to weight indicators used in connection with operations for drilling oil, water or gas wells. It is designed to be secured in the line used to support the drill stem and bit in drilling operations and to indicate the amount of the load suspended by the cable. This invention is designed as an improvement on the apparatus disclosed in my prior Patent Serial No. 1,333,802, patented March 16, 1920.

The object of my invention is to provide a means in connection with load indicators to prevent undue fluctuation of the indicating hand due to the vibration resulting from the drilling operations.

Referring to the drawing herewith wherein like parts are designed by like numerals in both of the views: Fig. 1 is a central longitudinal section through an indicator embodying my invention, and Fig. 2 is a similar sectional view showing a slightly different embodiment of my invention.

In carrying out my improvement it is my purpose to introduce into a weight indicator similar to that disclosed in my previous patent above metnioned, a shock absorbing means for taking up the vibration upon the indicator, thereby preventing the rapid fluctuation of the pointer upon the dial which might otherwise result from drilling hard material. In the embodiment of my invention, as shown in Fig. 1, I have employed a tubular housing 1, having therein a load supporting shaft 2, said shaft having at its upper end a block or nut 3 secured thereto. The lower end of the housing 1 is provided with a cap 4 threaded thereon. This cap has a central opening 5 therein, through which may reciprocate the rod 2. On the lower end of the said rod 2 is secured an attaching eye 6 for connection in the cable by means of which the drill is suspended. Between the nut 3 and the cap 4 I provide a load supporting spring 25, this spring being so positioned as to support the main body of the load pulling downwardly upon shaft 2. At the upper end of the nut 3 is secured a sleeve 7 extending upwardly a short distance within the housing. The upper end of the sleeve is extended inwardly to provide an annular flange 8. Within the sleeve 7 is a hollow plunger 9 which serves as a housing for the upper end of a spiral spring 10, said spring bearing at its lower end against the nut 3.

The housing 1 is threaded exteriorly at its upper end for attachment to a casting 11 which serves to house the indicating apparatus. This housing is cylindrical in general outline, having at one side thereof a dial plate 12. This dial plate has a laterally extending cylindrical bearing member 13, within which is supported the shaft 14. On the outer end of this shaft 14 is secured an indicating hand 15 in any suitable manner. On the inner end of the said shaft 14 is secured a small pinion 16. This pinion is positioned to mesh with a rack 17 upon a rod 18 resting at its lower end upon the plunger 9.

At the upper end of the casting 11 is secured a second housing 19, similar in general construction to the housing 1. It has at its upper end a cap 20, said cap having an eyelet 21 on the upper end thereof. Within this housing is a plunger 22 closed at its lower end and open at the top. This plunger houses the spiral spring 23 which bears at its upper end against the cap 20 and acts to force the plunger 22 resiliently downward. The rod 18 is rounded at 24 on its upper end and bears against the lower end of the plunger 22.

In the use of this type of indicator the device is used as a sort of scale and is ordinarily introduced into the supporting cable on that portion thereof called the dead-line, that is, the line which extends from the crown block down to the platform of the derrick and is secured thereto. An indicator placed in this position will support only a fractional part of the actual load, but when properly calibrated will indicate the total load supported by the cable. The amount of the load will be indicated by the hand 15 pointing to the characters upon a graduated dial. The load will serve to compress the spring 25 and will move the sleeve 7 and the piston 9 therein downwardly. The spring 10 within the piston 9 is, under ordinary circumstances, of sufficient strength to sustain the rod 18 and the rack thereon and also to hold in compressed position the upper spring 23. When the piston 9 is moved downwardly with the rod 2, it will allow the rack 17 to drop downwardly under the action of the spring 23, and, on its downward movement, will serve to rotate the pinion 6, thus actuating the indicating hand 15 upon the dial.

During the drilling operation, the load will, under ordinary circumstances remain constant for a period until an increase in a load has been supplied by the driller. The drill, in rotating on hard rock or other difficult formation will act to cause severe vibration of the drill stem, and thus cause a fluctuation of the weight upon the indicator as the drill stem moves up and down. Without the spring 9 between the nut 3 and the rod 18 this vibration would be communicated directly to the indicating hand 15, thereby causing it to oscillate relative to the dial. The action of the spring 10 will serve to break the jar due to rapid fluctuation, thus presenting the vibration of the indicator and preventing a severe jar upon the rack and pinion. This will not only serve to steady the apparatus, but will prevent the breaking of the parts of the indicating apparatus.

In Fig. 2 I have shown a slightly different embodiment of the shock absorbing apparatus. Between the rod 18 and the nut 3 I arrange a small housing 26 which is threaded to the lower end of the rod 18 and extends downwardly within the outer housing 1. Within this housing 26 is slidably secured a pin 27, said pin having a head 28 thereon which, in its lowest position, is adapted to rest upon a shoulder within the housing 26 to limit its downward movement. To the lower end of the pin 27 is secured a nut 29. This nut serves as a seat for the lower end of a spiral spring 10' which bears at its upper end against an outer shoulder 30 upon the housing 26.

In this form of shock absorber the vertical movement of the rod 2, due to the vibration of the drill, will cause the movement of the pin 27 within the housing 26, the spring 10' thus acting to take up the vibration. Any marked change in the amount of weight supported upon the rod 2 will, however, serve to allow the spring 10' and the rod 18 to be depressed so as to rotate the indicating hand upon the dial and thus show the change in the load.

Either of these two types of shock absorbers are practically essential to the efficient operation of the indicating means. Without such a shock absorber the rapid vertical fluctuation of the rod 2 will cause the upper end of the said rod to strike with force against the lower end of the shaft 18, thus causing rapid wear or injury to the pinion 16 and the indicating means secured thereon. Furthermore, the rapid fluctuation of the hand upon the dial makes it difficult to read with accuracy the amount of the load suspended.

Having thus described my invention, what I claim as new and desire to protect by Letters Patent is:

1. In a weight indicating device, a tubular housing, a load supporting shaft slidable in said housing, a spring in said housing supporting said shaft, an indicator actuating rack above said shaft, a spring between said rack and said shaft and resilient means in said housing above said rack, acting to press said rack downwardly.

2. In a weight indicating device, the combination of a load supporting shaft, a spring supporting said shaft, a rack above said shaft, means to force said rack resiliently downward, acting as a shock absorber above said rack, a plunger upon which said rack is adapted to rest, a spring between said rack and said shaft and means to indicate the movement of said rack.

3. In a weight indicating device the combination of a resiliently mounted load supporting shaft, a rack above said shaft, a plunger and spring between said rack and shaft, means to hold said rack downwardly against said plunger, and means operated by the movement of said rack to indicate the load on said shaft.

In testimony whereof I hereunto affix my signature this the 29th day of August, A. D. 1921.

HAROLD W. FLETCHER.